US006842806B2

(12) United States Patent
Ervin

(10) Patent No.: US 6,842,806 B2
(45) Date of Patent: Jan. 11, 2005

(54) METHOD AND APPARATUS FOR INTERCONNECTING WIRED-AND BUSES

(75) Inventor: Joseph J. Ervin, Stow, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 485 days.

(21) Appl. No.: 09/866,889

(22) Filed: May 29, 2001

(65) Prior Publication Data

US 2004/0225812 A1 Nov. 11, 2004

(51) Int. Cl.$^7$ .............................................. G06F 13/00
(52) U.S. Cl. ..................................... 710/110; 710/314
(58) Field of Search ................................. 710/107, 110, 710/113, 201, 306, 311, 312, 314, 315, 316

(56) References Cited

U.S. PATENT DOCUMENTS

| 3,988,714 | A | 10/1976 | Bardotti |
| 5,090,014 | A | 2/1992 | Polich et al. |
| 5,404,532 | A | 4/1995 | Allen et al. |
| 5,455,915 | A | 10/1995 | Coke |
| 5,469,463 | A | 11/1995 | Polich et al. |
| 5,546,546 | A | 8/1996 | Bell et al. |
| 5,632,021 | A | 5/1997 | Jennings et al. |
| 5,751,975 | A | 5/1998 | Gillespie et al. |
| 5,761,461 | A | 6/1998 | Neal et al. |
| 5,822,583 | A | 10/1998 | Tabuchi |
| 5,892,933 | A | 4/1999 | Voltz |
| 6,018,526 | A | 1/2000 | Liu et al. |
| 6,026,352 | A | 2/2000 | Burns et al. |
| 6,145,009 | A | 11/2000 | Miyazawa et al. |
| 6,182,178 | B1 | 1/2001 | Kelley et al. |
| 6,205,147 | B1 | 3/2001 | Mayo et al. |
| 6,212,676 | B1 | 4/2001 | Seaman et al. |
| 6,260,092 | B1 | 7/2001 | Story et al. |
| 6,397,268 | B1 | 5/2002 | Cepulis |
| 6,542,953 | B2 | 4/2003 | Porterfield |
| 6,591,322 | B1 | 7/2003 | Ervin et al. |
| 6,594,712 | B1 | 7/2003 | Pettey et al. |
| 6,625,675 | B2 | 9/2003 | Mann |

FOREIGN PATENT DOCUMENTS

| EP | 0 607 733 A1 | 7/1994 |
| WO | WO 94/14121 A1 | 6/1994 |
| WO | WO 09/34376 A2 | 8/1998 |
| WO | WO 02/10933 A1 | 2/2002 |

OTHER PUBLICATIONS

Philips, "I2C Bus Repeater, data sheet, PCA9515", pp. 1–10, Mar. 7, 2001.

Anonymous, "Identical I2C Components Sharing a Unique I2C Address", Research Disclosure, vol. 41, No. 413, pp. 1244–1245, Sep. 1, 1998.

Deleganes, Ellen, "Using InfiniBand Architecture to Optimize Cache Fusion in Oracle 9 Real Application Clusters (RAC)", 2001, Intel.

Primary Examiner—Khanh Dang
(74) Attorney, Agent, or Firm—Kudirka & Jobse, LLP

(57) ABSTRACT

One or more bus bridges are used to partition a large I$^2$C bus into smaller bus segments. By programming address bit-maps that are internal to each bridge, the various bus segments can be made to appear as one logical bus. In addition, the bus topology can be designed to maximize the ability to isolate faults within a given segment, thereby improving the ability of technicians to diagnose problems in very large I$^2$C implementations. In one embodiment, the invention is a unidirectional bus bridge which is designed so that two such bridges can be used in parallel (facing in opposite directions) to implement a fully bi-directional bus bridge. In another embodiment, I$^2$C slave addresses are replicated in a single logical I$^2$C bus by addressing a tunnel command to a bridge, which command contains an address and causes the bridge to which it is addressed to forward the contained address.

39 Claims, 11 Drawing Sheets

US 6,842,806 B2

METHOD AND APPARATUS FOR INTERCONNECTING WIRED-AND BUSES

FIELD OF THE INVENTION

This invention relates to buses using a wired-AND protocol and, more particularly, to methods and apparatus for interconnecting having two or more such buses.

BACKGROUND OF THE INVENTION

The I²C bus system is an electronic bus for carrying commands and data between compatible devices connected to the bus. The system was developed and marketed by Philips Semiconductor Corporation and is described in detail in the I²C Specification, revision 2.0, Philips Semiconductor Corporation 1998, which specification is hereby incorporated by reference in its entirety. In the I²C bus system, two wires, called a serial data (SDA) line and serial clock (SCL) line, carry information between the devices connected to the bus. Both the SDA and SCL lines are bi-directional lines, connected to a positive supply voltage via pull-up resistors as shown in FIG. 1 to form a "wired-AND" configuration. For example, in the bus configuration 100 illustrated in FIG. 1, the SDA line 108 and the SCL line 110 are connected to the $V_{DD}$ supply line 102 by pull-up resistors 104 and 106, respectively. Other buses, which use a similar protocol, include the SMBus, Access.bus and the InfiniBand[SM] management link. Collectively, this type of bus system will be termed a "wired-AND" bus system. The remainder of the discussion will focus on the I²C bus system with the understanding that the discussion applies to these other bus systems as well.

When the bus 101 is free, both the SDA line 108 and the SCL line 110 are pulled to a "HIGH" state by the resistors 104 and 106. The output stages of devices connected to the bus must have an open-drain or open-collector in order to form the wired-AND configuration. Two devices 112 and 114 are shown schematically in FIG. 1. Device 112 has a clock output stage which includes output transistor 116 which is connected across the SCL line 110 and ground 118. When a signal on the gate 117 of transistor 116 turns the transistor on, it pulls the SCL line 110 "LOW." Clock signals on the SCL line 110 can be detected by means of buffer 120 whose output forms the "clock in" line 122.

Similarly, device 112 has a data output stage which includes output transistor 124 which is connected across the SDA line 108 and ground 126. When a signal on the gate 123 of transistor 124 turns the transistor on, it pulls the SDA line 108 "LOW." Data signals on the SDA line 108 can be detected by means of buffer 128 whose output forms the "data in" line 130. Device 114 also has a clock output transistor 132 and clock input buffer 134 and a data output transistor 136 and data input buffer 138 for communication with the SDA and SCL lines, 108 and 110.

Devices on the bus communicate by periodically pulling the SDA and SCL lines 108 and 110 LOW producing data and clock pulses on the lines 108 and 110. In accordance with the I²C protocol, the data on the SDA line 108 must be stable when the clock line SCL 110 is HIGH. Thus, the HIGH or LOW state of the data line 108 can only change when the clock line 110 is LOW. Two unique situations arise, which situations are defined as START and STOP conditions. In particular, a HIGH to LOW transition on the SDA line 108 while the SCL line 110 is HIGH is defined as a START condition. A LOW to HIGH transition on the SDA line 108 while the SCL line 110 is HIGH is defined as a STOP condition.

Each device 112, 114 on the bus 101 has a unique address and can operate as either a data transmitter or a data receiver, depending on the function of the device. For example, an LCD driver is always a data receiver, whereas a memory can both receive and transmit data. In addition to being transmitters and receivers, devices can also be bus masters or slaves when performing data transfers. A bus master is the device that initiates a data transfer on the bus, generates the clock signals required for that transfer and terminates that data transfer. During this transfer, any other device to which data is sent, or from which data is received, is considered a slave. The bus master may transmit data to a slave or receive data from a slave. In both cases, the clock signals are generated by the bus master. Bus master and slave relationships are not permanent and depend on which device initiated the data transfer at a given time.

More than one bus master device can be connected to bus 101. Bus implementations with exactly one device capable of acting as a master are called single-master buses, while those with two or more devices capable of acting as bus masters are called multimaster buses. In a single-master bus system, the I²C protocol is very straightforward, with every transaction consisting of a START condition followed by one or more address and data phases, followed by a STOP condition. Thus, the START and STOP conditions frame all activity on the bus and hence define the duration during which the bus is busy.

A slave device responds to an address or data phase generated by the master with either an acknowledgement (ACK) or a negative-acknowledgement (NAK) response. An ACK response is represented as a LOW signal level on the SDA line 108 during the acknowledge bit time, which is defined as the ninth clock pulse of any address or data phase. A NAK response is represented as a HIGH signal level on the SDA line 108 during the acknowledge bit time. Since the I²C bus is a wired-AND configuration where the buses are always HIGH unless pulled LOW by a device, a NAK response is equivalent to no response from a slave device. A NAK response during an address phase may indicate that the slave device is busy and unable to accept I²C transactions at this time, that it is non-functional or simply missing.

While a simple single-master system using the I²C technology works well, the situation becomes much more complicated when much larger and more complex I²C subsystems involving multiple unique master devices and dozens of slave devices on a single bus are constructed. Perhaps the biggest challenge in the design of any large multi-master I²C subsystem is the difficulty of ensuring reliable operation in the presence of multiple master implementations designed by different vendors. Since most I²C devices are used in simple single-master bus implementations, many available I²C master devices which claim to support multi-master operation have not been tested and verified sufficiently to be used together reliably on a single I²C bus. Furthermore, the wire-AND nature of the I²C bus means that a failure of any one device can cause the entire bus to fail, leading to difficulties in isolating the cause and nature of the fault that caused the bus failure.

In addition, one of the fundamental signal integrity challenges in any large I²C system design is meeting the rise-time specification of one microsecond on the SDA and SCL signals. Because these are open-collector signals, usually with a simple pull-up resistor to the supply rail, the rise time is proportional to the total capacitance on the bus. Further, the strength of the pull-up resistor is limited by the maximum current that the output cells on I²C components can sink, which is stated in the aforementioned I²C specification as 3 ma. Thus, the total capacitance that an I²C bus segment can tolerate is approximately 400 picofarads, beyond which the rise-time specification cannot be met. These design constraints limit both the number of master and slave devices on the bus as well as the physical length of the bus, making large I²C system designs very challenging.

Therefore there is need for a method and apparatus to reliably construct complicated I²C systems and to isolate faults so that they can be eliminated.

SUMMARY OF THE INVENTION

In accordance with the principles of the invention, one or more bus bridges are used to partition a large I²C bus into smaller bus segments. By programming address bitmaps that are internal to each bridge, the various bus segments can be made to appear as one logical bus. In addition, the bus topology can be designed to maximize the ability to isolate faults within a given segment, thereby improving the ability of technicians to diagnose problems in very large I²C implementations.

In particular, each bridge implements address filtering so that transactions are forwarded from one side of the bridge to the other based on the contents of an internal address bitmap. This bitmap can be initialized by software running on an intelligent I²C master, called a "configuration host", to allow I²C slave addresses to be arbitrarily populated on either side of the bridge.

In one embodiment, the invention is a unidirectional bus bridge which is designed so that two such bridges can be used in parallel (facing in opposite directions) to implement a fully bi-directional bus bridge.

In accordance with another embodiment, the bridge also allows duplicate I²C slave addresses to be used in a single logical I²C bus. Devices with duplicate addresses can be reached by a tunnel command addressed to a bridge. The tunnel command contains an address and causes the bridge to which it is addressed to forward the contained address.

Finally, in still another embodiment, the inventive bridge implements a set of registers which, when programmed by the host, control the bridge to allow the construction of complex I²C bus hierarchies, using a tree topology. In such a configuration, I²C masters can communicate with slave devices without regard to the relative location of the master and slave. In accordance with the inventive principles, the transactions will be forwarded as needed across levels of bus hierarchy to complete a communication path between master and slave.

BRIEF DESCRIPTION OF THE DRAWINGS

The above and further advantages of the invention may be better understood by referring to the following description in conjunction with the accompanying drawings in which.

DETAILED DESCRIPTION

Figure 1:
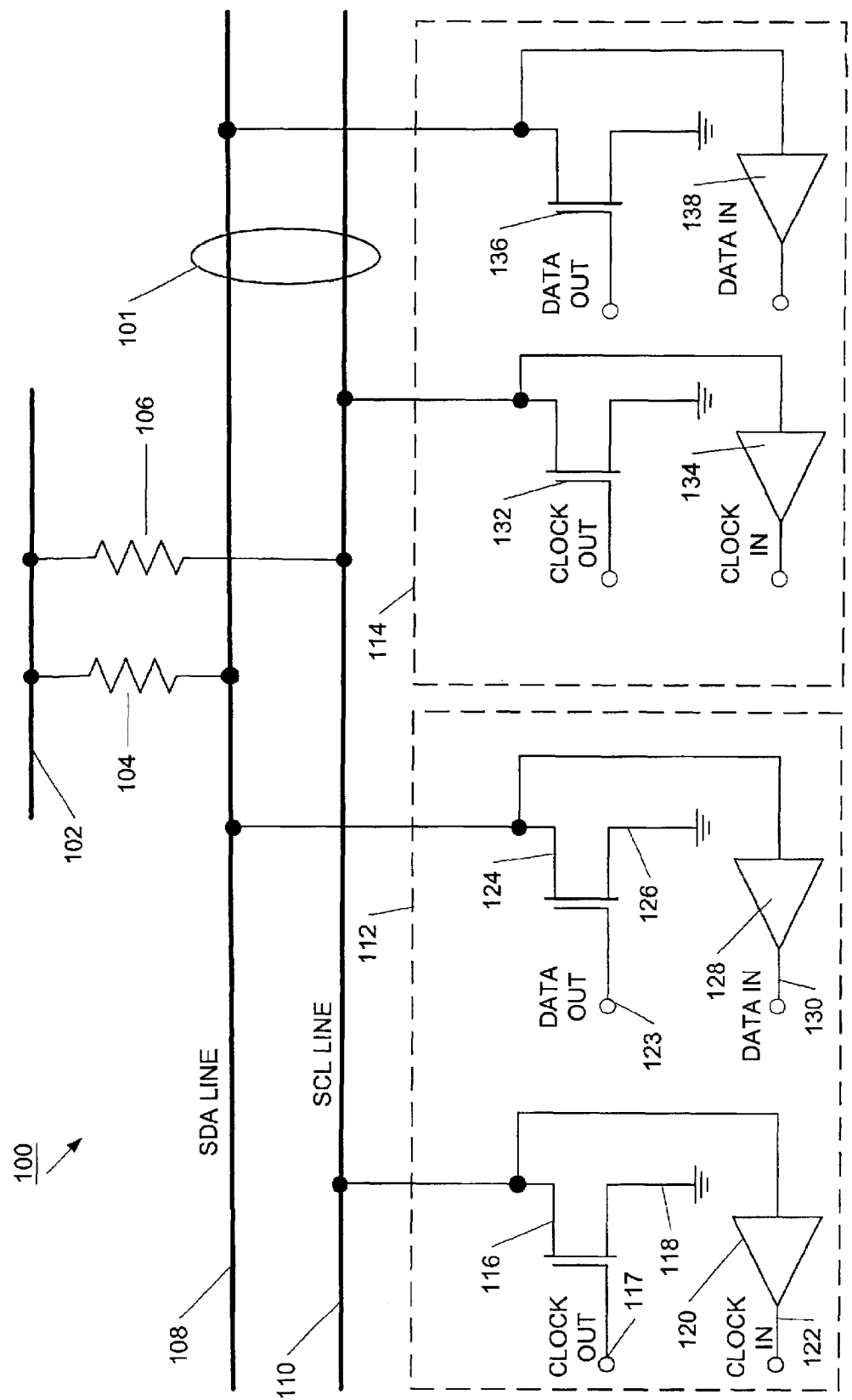
FIG. 1 is a schematic electrical diagram of the conventional I²C bus system illustrating the manner of driving information onto the bus system and receiving information from the bus system.

The invention concerns a bus bridge apparatus and method that buffers I²C transactions generated on one I²C bus by a bus master and retransmits the transactions on another bus segment. During this retransmission, the I²C address may also be filtered and translated. In one embodiment, the bridge is implemented by one or more unidirectional devices; there are several different configurations in which the bridge devices can be used. For example, a single bridge device could be used to provide electrical isolation and loading isolation between two I²C domains where the transaction flow from one domain to the other is always unidirectional. Alternatively, multiple bridge devices could be placed as "peers" on a top-level bus with the system's main I²C controller, connecting to a set of downstream I²C buses, thus implementing a tree topology.

In a single unidirectional bridge application, two I²C domains are separated by a bridge constructed, as described below, with a single microcontroller chip. Since the bridge constructed in this manner is a unidirectional bridge, transactions may pass only in one direction—from a port-A side of the bridge to a port-B side. However, the direction of data flow can be bi-directional, allowing both reads and writes. Used in this manner, the bridge device can act as a sort of "firewall." For example, suppose an I²C implementation contains multiple masters, and one of these masters is not multimaster capable. By placing the nonmultimaster-capable master by itself on the port-A bus, and connecting the other masters and all slave devices on the port-B bus, the nonmultimaster device on the port-A bus would be able to communicate with all the devices on the port-B bus (through the bridge), but would be freed from the burden of handling the many complexities of multimaster I²C. A detailed disclosure of a firewall device constructed in this manner is set forth in U.S. patent application Ser. No. 09/630,099, entitled METHOD AND APPARATUS FOR CONNECTING SINGLE MASTER DEVICES TO A MULTIMASTER WIRED-AND BUS ENVIRONMENT, filed on Aug. 1, 2000 by Joseph J. Ervin and Jorge E. Lach, now U.S. Pat. No. 6,591,322 B1, the disclosure of which is hereby incorporated by reference in its entirety.

As discussed above, in a preferred embodiment, the bridge device is implemented in a programmable microcontroller, but other implementations are possible. A microcontroller, which is suitable for use with the invention, is the device 87LPC764, manufactured and sold by Philips Semiconductor Corporation. This controller is programmed with firmware, and hence the preferred embodiment is a combined hardware and software implementation. In addition to other hardware resources, this microcontroller has one multimaster I²C interface. Clearly, however, the inventive apparatus needs two I²C interfaces to fulfill its function as a bridge. Thus, the microcontroller's built-in I²C interface is used for the port-B bus and the port-A bus is implemented using two General Purpose Input/Output (GPIO) pins on the microcontroller and a software 'bit-bang' driver.

Figure 2A:
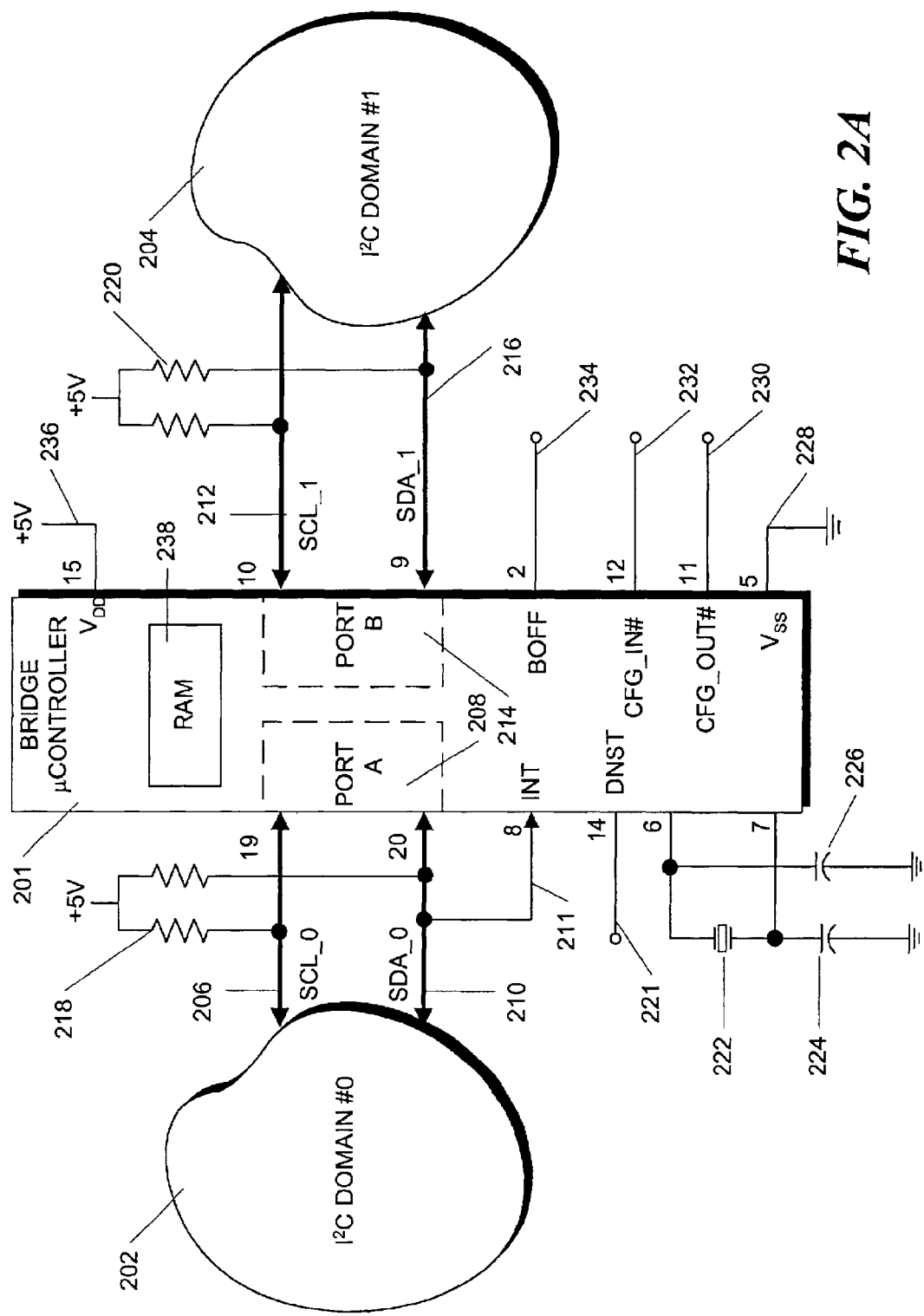
FIG. 2A is a detailed block schematic diagram of an inventive unidirectional bridge apparatus implemented with a microcontroller and connected between two I²C domains.

FIG. 2A shows how a microcontroller 201 is used to connect two I²C domains 202 and 204. The 87LPC764 controller 201 includes 4 KB of One-Time-Programmable (OTP) internal memory that is used as program code space. Thus, the bridge software is embedded within the 87LPC764 controller 201. The 87LPC764 controller 201 runs with a 20 MHZ input clock provided by crystal 222 and capacitors 224 and 226, and has an internal machine cycle which is $\frac{1}{6}^{th}$ of the input clock, or approximately 3.3 MHz. The pin numbers of the 87LPC764 controller are denoted next to their respective leads. Power is applied to pin 15, via lead 236, and ground is applied to pin 5, via lead 228.

The 87LPC764 microcontroller 201 includes one multimaster-capable I²C interface. In the present application, this port is reserved for the port-B interface 214. This I²C interface presents the software running on the 87LPC764 with a 1-bit wide data path onto the I²C bus, so software must interact with the register interface on a bit-by-bit basis. Although this requires more software to drive the I²C interface than with byte-oriented I²C devices, the bit-oriented interface is actually preferred in that it allows software a much finer level of control over the bus 212, 216. This is particularly useful during bus recovery procedures after a fatal protocol error that causes the bus to hang.

The port-A interface 208 receives transactions from the I²C domain #0 202 via the SCL_0 and SDA_0 lines 206 and 210 that are normally held HIGH by resistor pair 218. The port-B interface 214 drives the SCL_1 and SDA_1 lines 212 and 216 that are normally held HIGH by resistor pair 220 and communicate with I²C domain #1 204.

In order to reliably detect new START conditions on the port-A interface 208 while finishing up the end of a previous I²C transaction on the port-B interface 214, the port-A SDA_0 line 210 is connected to the microcontroller 201 external interrupt input on pin 8, via lead 211, in addition to being connected to the appropriate port-A GPIO pin 20. This interrupt is enabled only when the port-A bus 206, 210 is not busy, i.e. immediately after a reset, and between STOP and START conditions on the port-A bus 206, 210. Thus, the initial START condition of any port-A transaction is detected via this interrupt mechanism, while all other port-A activity for the remainder of a transaction is detected via polling.

The bridge apparatus also incorporates an array located in RAM 238. The array is used as an address bitmap indicating which I²C addresses reside on the port-A interface and which are on port-B interface, thereby permitting the bridge to implement address replication and filtering. Address replication and filtering involves receiving an address from a first bus segment and selectively transmitting the address on another bus segment under control of the address bitmap. Replication of slave addresses may be useful, for example, if a system implementation includes multiple masters, each with some number of identical slave devices. Replication can be used, for example, in a system with two intelligent masters, each with an identical I²C EEPROM device used for local nonvolatile storage. If the masters never need to communicate directly with the EEPROM of the other master, the system can be implemented with two I²C bus segments connected by a bi-directional bridge implemented as discussed below. By configuring the address bitmaps in the bridge correctly, the addresses of the EEPROM devices could be local to each bus segment, but the masters could still communicate with one another. Furthermore, any devices that have unique addresses could be placed on either segment, with access from the remote master provided through the bridge.

Figure 2B:
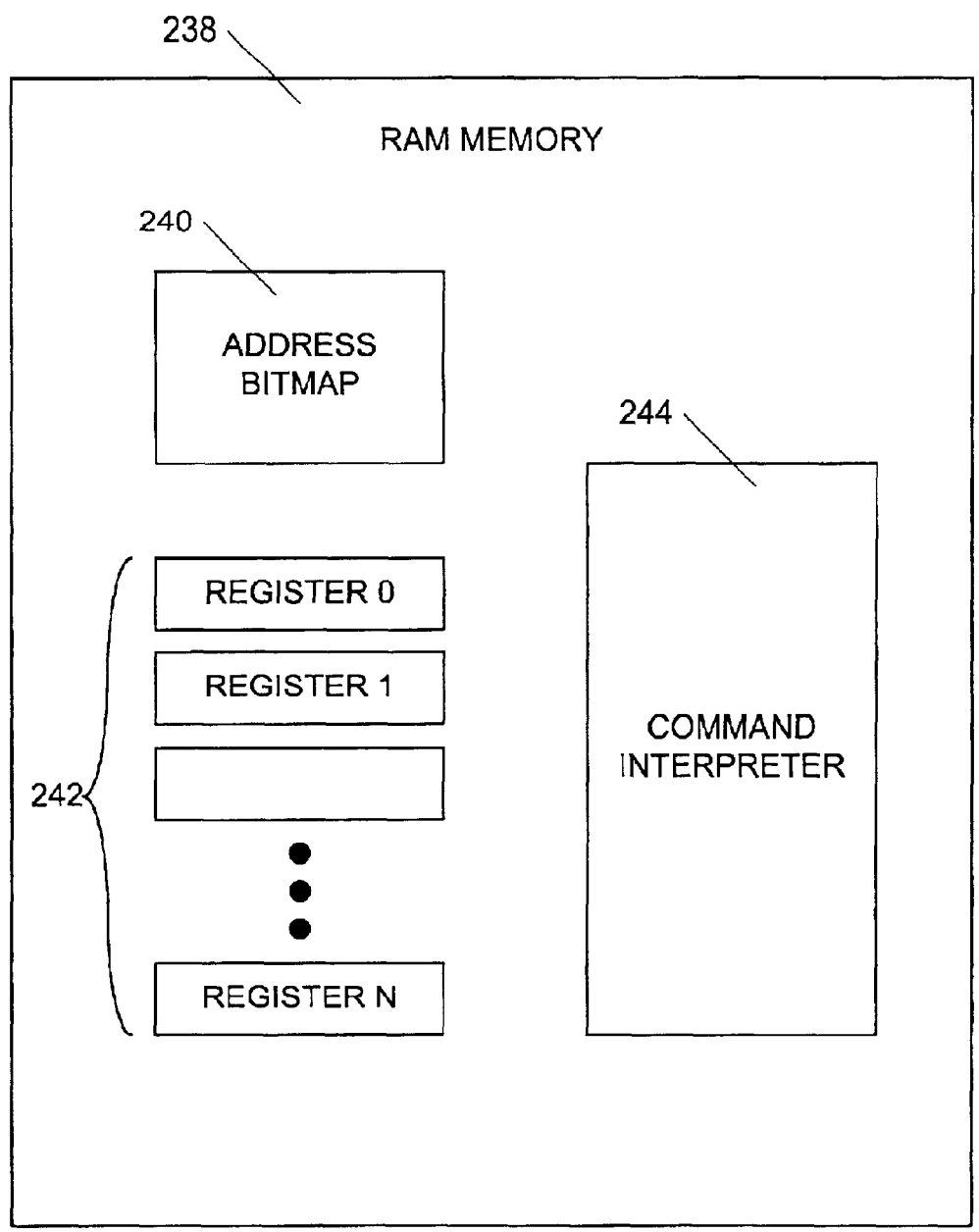
FIG. 2B is a block schematic diagram of the some of the contents of the RAM memory in the microcontroller of FIG. 2A.

FIG. 2B shows some of the contents of the RAM 238 including the address bitmap 240 and a set of internal registers 242 which are described in detail below. Also included is a command interpreter 244 which receives and parses commands addressed to the bridge. This interpreter would normally be implemented in firmware and its operation is discussed in detail below.

The address filter bitmap comprises 32 bytes. Each of the 32 bytes, in turn, comprises 256 bits, which gives one bit per I²C address. Using this bitmap, a special master called a "configuration host" can control on an address-by-address basis, which addresses are ignored by a given bridge, and which are forwarded transparently from the port-A bus to the port-B bus. The operation of the configuration host and the manner in which it controls the bridges is discussed in detail below.

The relationship between bits in the bitmap and I²C address is that first byte in the bitmap maps I²C addresses 00h through 07h ("h" stands for hexadecimal notation), with bit<0>corresponding to address 00h, bit<1>corresponding to I²C address 01h, and so on. In accordance with conventional I²C specifications, even numbered bits correspond to write addresses, and odd numbered bits correspond to read addresses. In order to address a bridge itself, the address is either 62h or 63h depending on whether the transaction is a write or read.

The bridge will forward a transaction if the corresponding bit in the bitmap is a "1". However, the address filtering mechanism will not pass transactions addressed to the bridge's own I²C address of 62h or 63h. These addresses, however, may be reached on the other side of a bridge through a procedure called "transaction tunneling" that is discussed in detail below. Transaction tunneling allows a master to send a special command to a bridge address. The command contains another address. When a bridge receives this command it transmits the command to the address contained within the command. This arrangement allows software on a configuration master, for example, to tunnel a transaction through a bridge to probe for other bridges.

The transaction tunneling mechanism provides a way for masters to communicate with devices on remote segments if the devices have addresses identical to a device on the masters local segment. For example, in some system implementations, it may be necessary to have multiple I²C devices at the same addresses and for one or more masters in the system to be able to uniquely access each of these devices. One such anticipated application of this type will be a computer chassis containing InfiniBand[SM] expansion slots for plug-in Target Channel Adapters (TCAs). All TCA cards are required to have a number of specified slave devices such as temperature sensors and EEPROM devices, and an intelligent master device. The addresses of these devices are identical from TCA to TCA. The InfiniBand[SM] application requires the ²C master in the chassis to have communication into each TCA, and also for at least one TCA per chassis to be able to communicate with the host I²C master in the chassis. Furthermore, the TCA cards are all hot pluggable, meaning that they may be plugged in while the chassis is powered up, and possibly while I²C activity is present on the host's bus segment.

The transaction tunneling mechanism allows a system designer to accommodate, for example, multiple plug-in cards or devices that include I²C slaves at the same addresses. By placing each of these plug-in devices behind a bridge, any master anywhere in the system can communicate specifically with any of these identically addressed slave devices. Furthermore, if bi-directional bridges are used, then each of the plug-in devices can also communicate through the bridge with any devices elsewhere in the system. When an I²C master wishes to communicate with a device behind a bridge via tunneling, it simply formats a message directly to the bridge indicating in the body of the message the address of the device with which it wants to communicate.

In addition, each bridge contains a number of internal registers located in the RAM 238 that are used by a configuration host to configure all the bridges in the bus hierarchy after coming out of a reset condition. These registers may also be used to enable and disable certain features of a bridge, such as whether address filtering is in use.

Figure 3A:
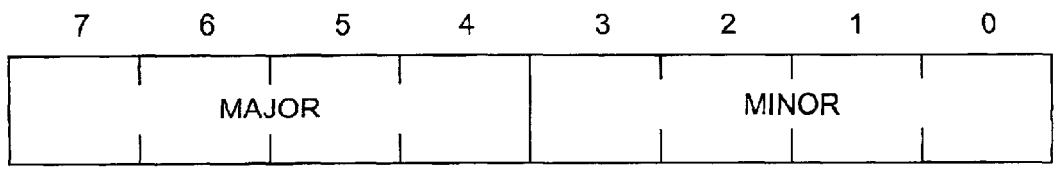
FIGS. 3A–3I shown the contents of various registers in the bridge apparatus.

The set of the internal registers is shown in FIGS. 3A–3I. The registers are accessed via special I²C transactions that are described below. The REVISION register, shown below in FIG. 3A, provides an indication of the revision of the bridge chip itself to software running on the configuration host. This information may be used to take advantage of features or changes on a revision-by-revision basis. Bits 7 to 4 indicate the major release level, and bits 3 to 0 indicate the minor release level. For example, a revision of 1.7 would be indicated by a hexadecimal value of 17h.

Figure 3B:
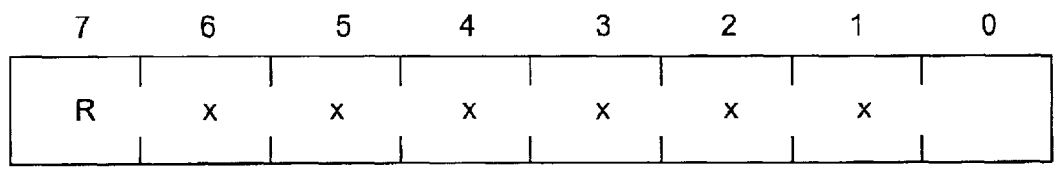

The RESET register, shown in FIG. 3B, can be used to initiate a software reset of the bridge circuit. Writing to this register with bit 7 equal to "1" will cause the bridge to undergo a full reset, equivalent to the assertion of the RESET input pin on the chip itself.

Figure 3C:
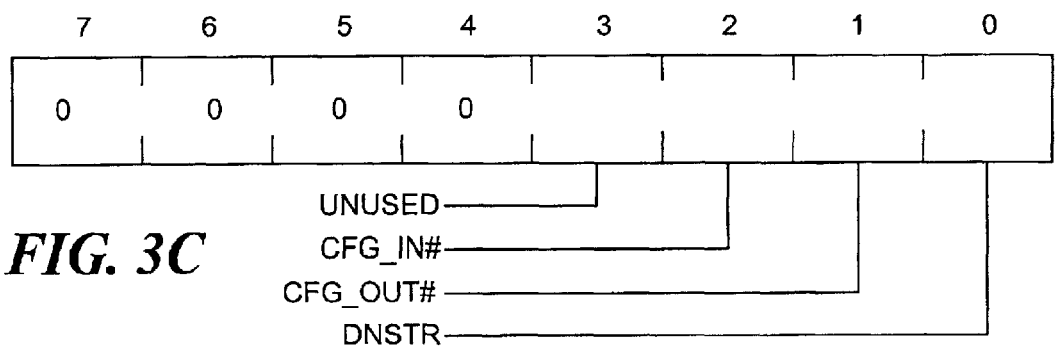

The STATUS register, shown in FIG. 3C, provides the configuration host with visibility into the status of several of the pins on the bridge chip. This register is read-only—writes have no effect. Bits 7 to 4 are unused and always read as zero.

Figure 3D:
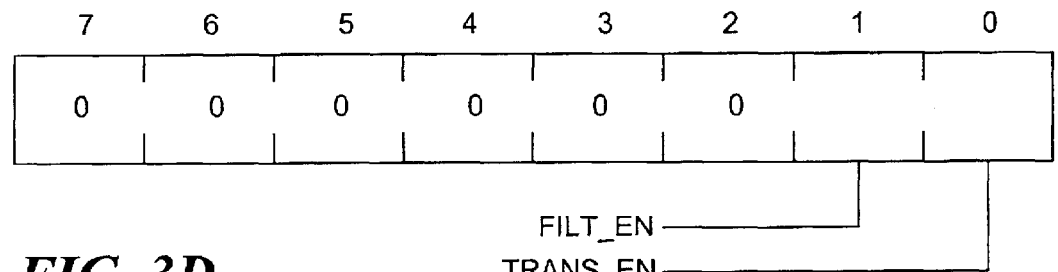

The FLTR_CTL register, shown in FIG. 3D, allows the configuration host to select between three distinct modes of operation with regard to address filtering, controlled by the FILT_EN and TRANS_EN bits. The FILT_EN and TRANS_EN bits are cleared by a hardware or software reset. The three modes of operation are given below in Table 1.

TABLE 1

| TRANS_EN | FILT_EN | Description |
| --- | --- | --- |
| 0 | 0 | Disabled. No addresses forwarded to Port-B bus. |
| 0 | 1 | Normal. Addresses filtered based on address bitmap. |
| 1 | X | Fully transparent. All addresses passed to port-B, except the bridge address 62h. |

The description of each mode is given in the last column of the table. The transparent mode is equivalent to setting all the bits in the address bitmap and then enabling address filtering. This mode of operation is provided to simplify bridge configuration when the bridge is used being used in a "firewall" application.

Figure 3E:
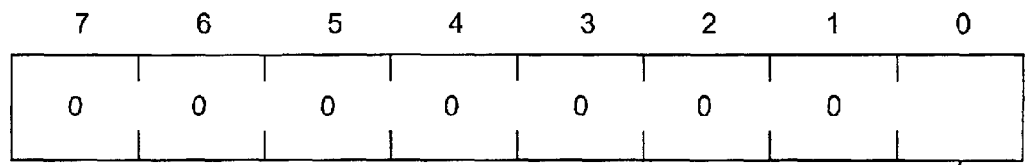

The DA_CTL register, shown in FIG. 3E, allows the configuration host to control whether a given bridge implements a deterministic arbitration (DA) protocol, as described in U.S. Pat. No. 6,175,887 and discussed below. This register consists of a single bit, which when written to "1", enables the DA protocol, utilizing the arbitration ID given in the DA_ID register. The DA_EN bit is cleared by a hardware or software reset.

Figure 3F:
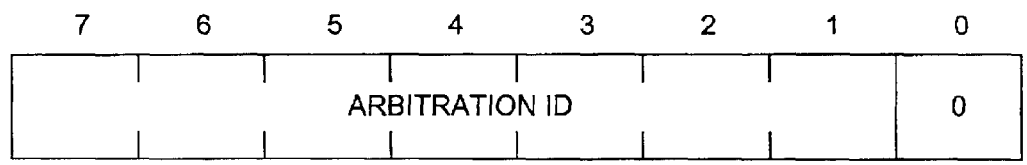

The DA_ID register, shown in FIG. 3F, is used by the configuration host to program the ID driven by this bridge on its port-B bus when it is configured to use the DA protocol. The contents of this register are initialized to 20h at reset. Only bits 7 to 1 are programmable; bit 0 is forced to a "0" to ensure that the ID corresponds to a write address. Software on the configuration host should program this register with the desired arbitration ID.

Figure 3G:
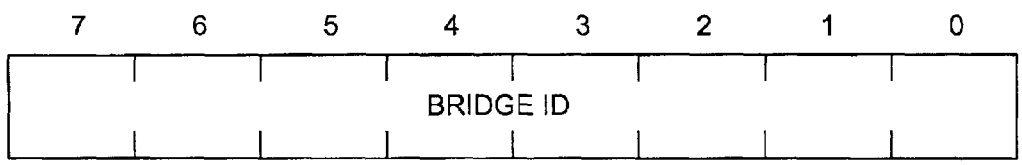

The BR_ID register, shown in FIG. 3G, is where the configuration host programs the bridge ID of the bridge containing this register. The values 00h and 01h are reserved; the bridge will ignore attempts to program these values into this register. Following a hardware or software reset, this register is reset to 00h for a downstream bridge (DNSTR pin HIGH), and to 01h for an upstream bridge (DNSTR pin LOW).

The aforementioned terms "upstream" and "downstream" refer to the location of the configuration host processor relative to the port-A bus and the port-B bus. The upstream bus is defined to be the bus with the fewest bridges in the path to the configuration host. The other bus is the downstream bus. This distinction is more apparent in larger tree configurations where there may be several levels of bus hierarchy between the configuration host and the most distant I²C devices.

The BR_ID register is used in conjunction with the CFG_IN# and CFG_OUT# pins (232 and 230, FIG. 2A) in order to allow a configuration host to configure multiple peer bridges connected to the same bus with their port-A interfaces. Peer bridges on a given bus segment are connected in a "daisy chain" with the CGF_OUT# pin of a bridge connected to the CFG_IN# of another bridge. Unconfigured downstream bridges come out of RESET with their bridge IDs set to 0. The CFG_IN#/CFG_OUT# daisy chain allows unconfigured peer bridges to determine which one of them will respond to configuration commands from the configuration host. The CFG_IN# pin is strapped LOW on the first bridge in the chain to indicate that it may respond to bridge commands addressed to bridge #0. After each bridge in the daisy chain is given a valid ID by the configuration host, it passes the LOW value to the next bridge in the chain.

Figure 3H:
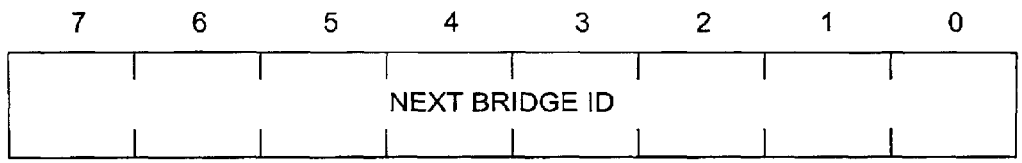

In particular, when the BR_ID register contains 00h, the bridge containing the register can respond to bridge commands only if its CFG_IN# daisy chain input 232 is LOW. When the configuration host programs this register to a valid value (not 00h or 01h) the CFG_OUT# pin 230 will automatically go LOW to pass the daisy chain signal to the next downstream bridge on this bus segment. This allows the next unconfigured bridge in the chain to respond to bridge commands from the configuration host. The UNCONFIG bridge command will return downstream bridges to an ID of 00h and upstream bridges to 01h, and will cause the CFG_OUT# pin to go HIGH The NXT_BRID register, shown in FIG. 3H, is where the configuration host programs the start of the range of bridge IDs that exist downstream of this bridge. The term "downstream" means in the direction of the port-B bus for a downstream bridge (DNSTR pin HIGH), and it means in the direction of the port-A bus for an upstream bridge (DNSTR pin LOW). This register is used together with the LST_BRID register to form a range of bridge IDs.

When a bridge command is received by a bridge on its port-A bus, it first checks whether the specified bridge ID matches its bridge ID as programmed in the BR_ID register. If not, then downstream bridges check to see whether the specified ID falls within the range defined by the value in the NXT_BRID register to the value (inclusive) in the LST_BRID register. If the bridge ID is within this range, the bridge forwards the transaction to its port-B bus. Similarly, upstream bridges check to see whether the specified bridge ID falls outside the range defined by the NXT_BRID and LST_BRID registers. If so, then the transaction is similarly forwarded to its port-B bus. Following a hardware or software reset, this register is set to 00h.

Figure 3I:
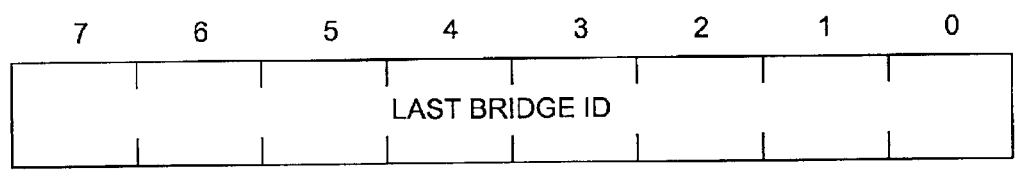

The LST_BRID register, shown in FIG. 3I, is where the configuration host programs the end of the range of bridge IDs that exist downstream of this bridge. Note that the term "downstream" means in the direction of the port-B bus for a downstream bridge (DNSTR pin HIGH), and it means in the direction of the port-A bus for an upstream bridge (DNSTR pin LOW). This register is used together with the NXT_BRID register to form a range of bridge IDs as discussed above. Following a hardware or software reset, this register is set to 00h.

Returning to FIG. 2A, the DNSTR pin 14 is pulled HIGH internally and, when it is left "floating", it indicates to the bridge 201 that the bridge is a "downstream bridge, i.e. its port-B interface 214 faces away from the aforementioned configuration host. As described below, the DNSTR signal is used by the bridge in conjunction with the backoff (BOFF) signal on lead 234 (generated at pin 2) to prevent a deadlock condition that can occur when two bridges are wired together to form a bi-directional bridge.

Figure 4:
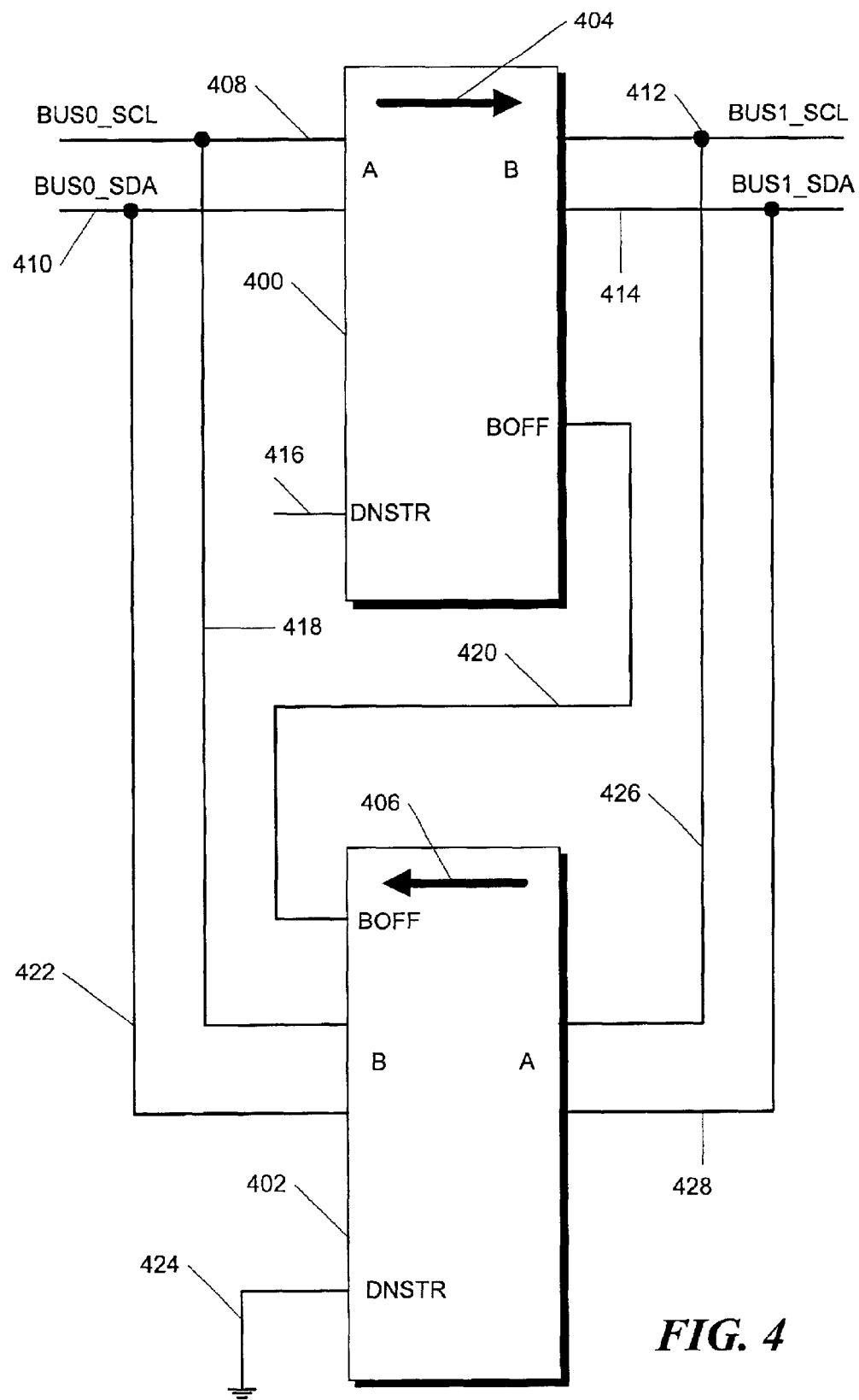
FIG. 4 is a block schematic diagram of two unidirectional bus bridge apparatus connected in parallel as a bi-directional bridge between two I²C systems.

In particular, as illustrated in FIG. 4, two unidirectional bridges 400 and 402 may be wired in parallel, transmitting transactions in opposite directions, to implement a transparent, bi-directional bridge. Bi-directional bridges can be used to allow a large multimaster I²C bus to be divided into two or more different domains, where each domain contains one or more masters and the slave devices that the masters access most frequently. By grouping related master and slave devices together in this way, multiple transactions can be in progress simultaneously between a master and its local slave devices. Thus, the aggregate throughput of the I²C system is maximized. Also, by programming the bridges to block transmission of certain addresses, a host controller can configure an I²C bus to simultaneously use the same address on different multiple bus segments, with the replicated addresses available only to bus masters that are local to that bus segment.

As shown in FIG. 4, bridge 400 transmits I²C transactions in the direction of arrow 404 and bridge 402 transmits I²C transactions in the direction of arrow 406. Bridges 400 and 402 connect two I²C buses. BUS0 represented by lines BUS0_SCL 408 and BUS0_SDA 410 is designated as the "upstream" bus and BUS1, represented by lines BUS1_SCL 412 and BUS1_SDA 414, is designated the "downstream" bus. BUS0 is connected to port-A of the bridge 400 and to port-B of the bridge 402, via lines 418 and 422. Similarly, BUS1 is connected to port-B of the bridge 400 and to port-A of the bridge 402, via lines 426 and 428.

FIG. 4 shows the wiring of the DNSTR and BOFF signals for two bridges used in a bi-directional configuration. These signals work together to prevent a "deadlock" situation that would occur if a master on BUS0 attempted to access a slave on BUS1, while, at the same time, a master on BUS1 attempted to access a slave on BUS0. Because each bridge chip will stall its port-A bus while attempting to acquire its port-B bus, there arises a situation where both buses can be stalled indefinitely. In order to give priority to the configuration host in such deadlock situations, the inventive bridges are arranged to always defer access to the downstream bridge.

For example, in the aforementioned deadlock situation, where transactions start simultaneously from masters on both sides of the bridge to slaves on opposite sides of the bridge, the bridge configured as the downstream bridge (with its DNSTR pin unconnected and floating HIGH) is constructed to drive the BOFF signal as an output to indicate that it is attempting to acquire the bus connected to its port-B interface. The upstream bridge (with its DNSTR pin tied LOW) is constructed to read the BOFF signal as an input. Thus, if the upstream bridge sees BOFF asserted HIGH while waiting to acquire the upstream bus (BUS0), it will abort the transaction by passing a NAK response back to the master on its port-A interface (BUS1).

With this operation, it is necessary for the master on BUS1 to terminate its transaction with a STOP condition so that the downstream bridge can complete the transaction. Since masters attempting transactions through upstream facing bridges may receive a NAK as a response to an address byte, they must be designed to gracefully terminate their transaction with a STOP and then retry the upstream transaction. It should be noted that there is no fairness associated with this backoff mechanism; upstream masters sending transactions downstream will always win over the downstream masters sending transactions upstream.

Any I²C system containing bridges constructed in accordance with the principles of the invention must have one or more bus masters defined as a "configuration host." In general, there will be only a single configuration host, although there may be multiple configuration hosts so long as they exist on the same bus segment. This arrangement is required because the upstream/downstream strapping of all the bridges in the system is relative to the configuration host. Thus, the configuration host must exist upstream of all bridges in the system in order for some of the configuration operations to work correctly.

For example, there is a configuration command called UNCONFIG, discussed in detail below, which is issued to all bridges simultaneously, via a broadcast addressing mechanism. Since these broadcast messages are only forwarded by downstream bridges, if there are any bridges upstream from the configuration host, they will not receive such broadcast messages.

The mechanism for all communication between an I²C master, such as the configuration host, and the inventive bridges are bridge "commands" such as those described below. In normal operation, a configuration host would use these bridge commands to discover the bus topology and to configure the address bitmaps of all bridges in the topology. Following this configuration, the configuration host can enable address filtering in all bridges (for which filtering is desired) at which point the bridges will transparently forward I²C transactions up and down through the bus hierarchy, providing transparent access to all unique slave addresses to all masters in the system. For slave addresses that are not unique, remote masters in the system may use a procedure described below and called "transaction tunneling" to request proxy access to the addressed device via the bridge connected to that device's bus on its port-B interface.

Figure 5:
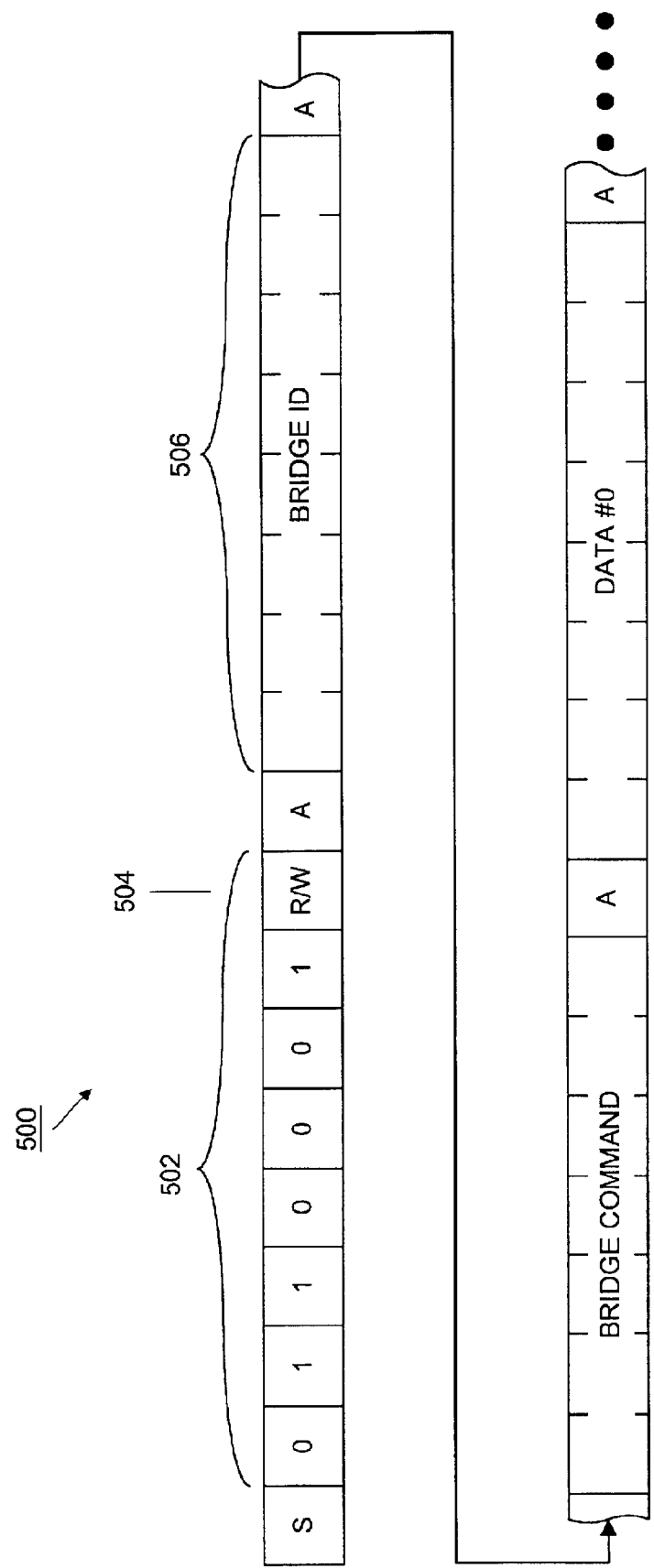
FIG. 5 is a time diagram showing the sequence of command signals generated by a bus master and used to control a bridge.

The bridge commands are specially formatted messages. The basic structure of a message 500 constructed in accordance with one embodiment is shown in FIG. 5. Although a particular message arrangement is discussed below, it would be obvious to those skilled in the art that other arrangements could also be used in order to accomplish the same results. FIG. 5 illustrates the bits of a message, as they would appear on the SDA line in time with time increasing to the right. In this transaction diagram and the following transaction diagrams, the symbol "S" indicates the I²C START condition, "Sr" indicates a repeated START, "P" indicates a STOP condition, "A" indicates a LOW level on a bus during an acknowledge bit, and "N" indicates a HIGH level during an acknowledge bit.

Like all I²C transactions, these messages start with an I²C address 502. As previously mentioned, the address used by all inventive bridges is either 62h or 63h depending on whether the transaction is a write or read. In these addresses the LOW bit 504 is a '0' for writes and a '1' for reads, in a manner similar to other conventional I²C devices. The way in which bridges are uniquely accessed is with a secondary addressing scheme called a "bridge ID." The bridge ID 506 appears as the first data byte in the I²C message 500 following the address 502. Following a hardware or software reset, all bridges are internally programmed to assume a default bridge ID of 00h for downstream bridges, and 01h for upstream bridges.

As is common among I²C devices that have internal registers, read operations are performed via an atomic write-read I²C operation. The write portion of the write-read transaction accomplishes several things. First, it provides the bridge ID byte to identify which bridge in the system is being targeted. Second, the write portion of the write/read transaction provides the bridge command byte 406, which tells the bridge what type of command the host is transmitting. Since the intended target bridge of the transaction could be on any bus segment in the system, the transaction will be forwarded throughout the bus hierarchy as required by all the bridges between the host and the target bridge.

Following the write portion of the write-read, the master device driving the transaction issues a repeated START followed by the address 63h. At this point, all bridges in the system are programmed to remember what type of operation was in progress, and to which bridge the operation was targeted. Thus, all bridges in the bus hierarchy between the master and the targeted bridge continue forwarding the transaction, just as during the write portion of the transaction. Since the logical path from the master to the target bridge is given explicitly in the write portion, and implied in the read portion, it is imperative that a master device issue a STOP condition before attempting to communicate with a different slave device. This STOP condition lets all the bridges in the system know that the operation is complete, and that they can return to normal operation.

In addition to specifying a unique bridge ID in the command syntax, the master responsible for configuring all the bridges, i.e. the configuration host, is allowed to issue a special bridge ID, called the "broadcast ID." In an illustrative embodiment, the broadcast ID is given the value FFh, and will cause the bridge command specified in the transaction to be forwarded by all downstream bridges in the system. This addressing scheme is reserved for a single command type called the UNCONFIG command, which the configuration host can use to return all bridges to their default, unconfigured state. In this state, all downstream bridges assume an ID of 00h, all upstream bridges assume an ID of 01h, and address filtering and support for other operations are disabled. The configuration host may then rediscover the bus topology and reconfigure all bridges in the system.

In order to allow a master to address a transaction to any bridge in the bus hierarchy without regard to the actual bus hierarchy configuration, each bridge knows in explicitly the bridge IDs of all the bridges downstream from itself. Therefore, it can determine for each bridge command presented to its port-A interface whether the destination bridge is located upstream or downstream from itself. The mechanism that allows a bridge to determine whether it needs to forward a bridge transaction from its port-A interface to its port-B interface is based on the aforementioned register pair NXT_BRID and LST_BRID which define the range of bridge IDs that are located downstream from this bridge. The use of two registers to define a range of bridge IDs that need to be forwarded implies a certain relationship between the bus topology and the scheme used to assign IDs to bridges. This bridge ID assignment scheme is discussed below.

Figure 6:
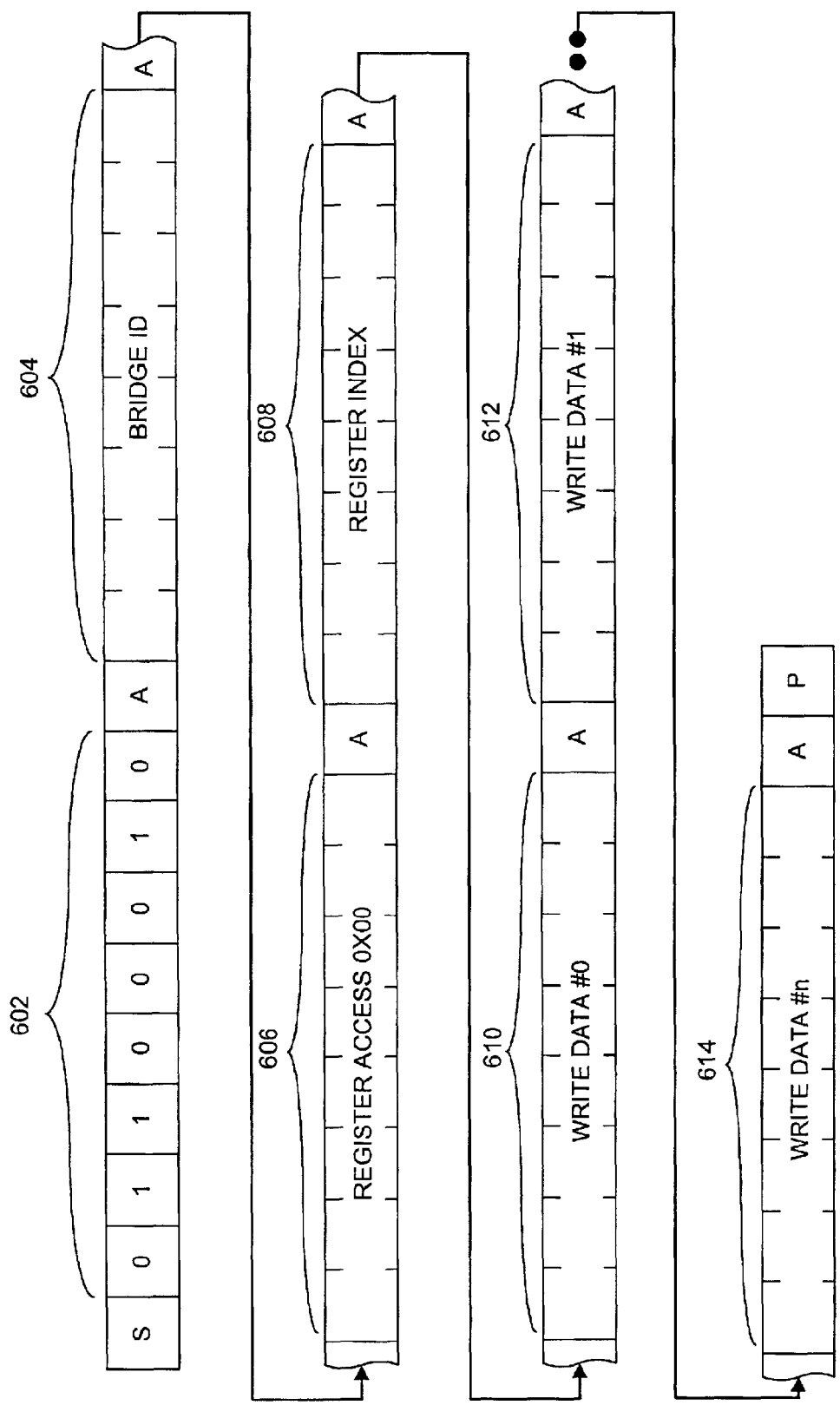
FIG. 6 is a time diagram showing the sequence of command signals generated by a bus master during a write register access bridge command.
Figure 7:
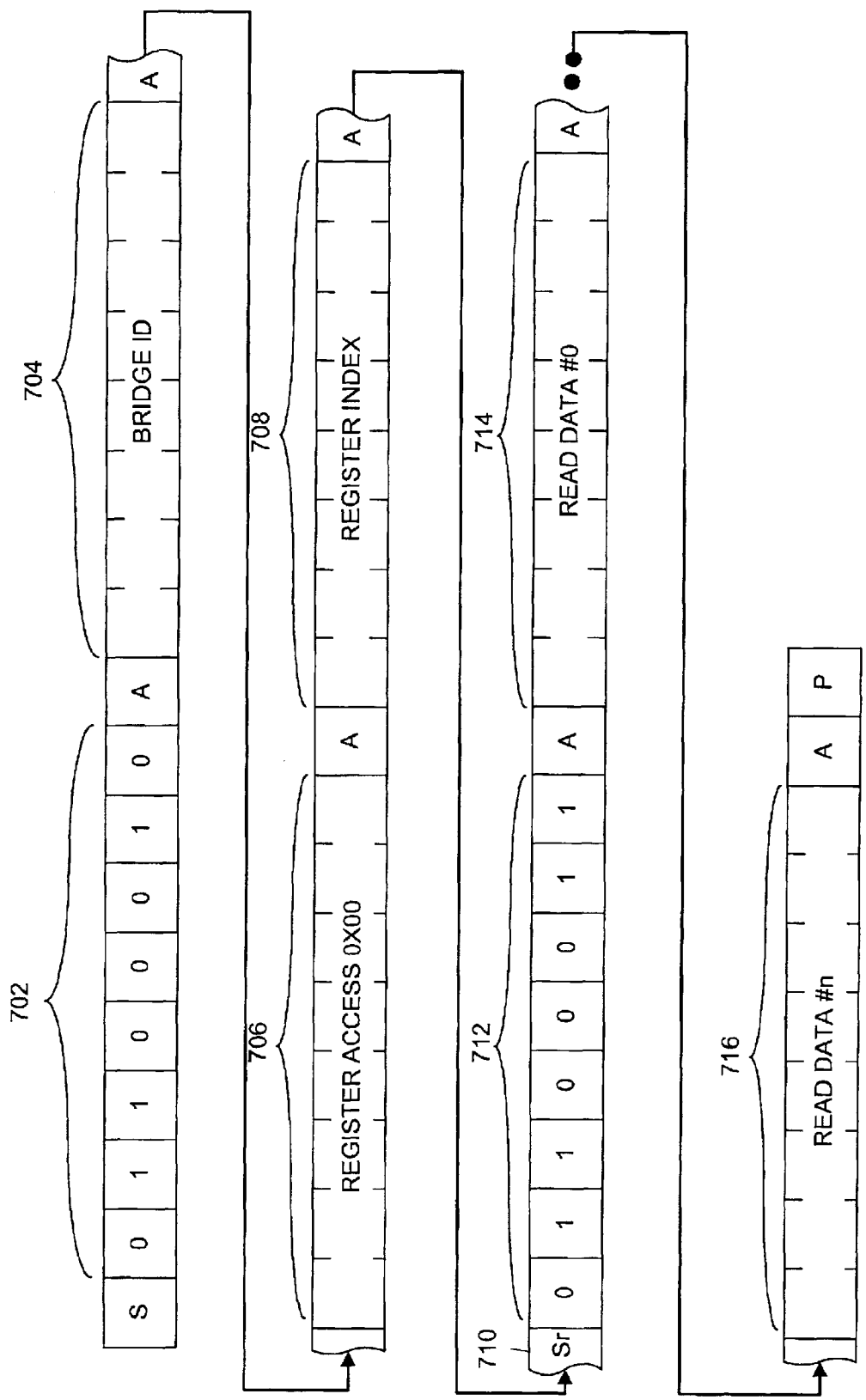
FIG. 7 is a time diagram showing the sequence of command signals generated by a bus master during a read register access bridge command.

A master can issue several command types to an inventive bridge. The first of these commands is a register access command and is issued by a master to read or write the internal registers (discussed above in connection with FIGS. 3A–3I) of a bridge. The syntax for the read and write transactions is shown in FIGS. 6 and 7 and is very similar to that used for other standard I²C components, such as a serial EEPROM. The essential difference is that the bridge transaction requires a bridge ID and a bridge command byte as the first two data bytes in the transaction.

The register access write command is shown in FIG. 6 and starts with the bridge address of 62h (602), followed by the bridge ID 604. Next, a command byte 606 of 00h is transmitted to indicate a register access command, and then the register index 608 is transmitted, followed by the byte or bytes 610–614 to be written. The writes to the internal register array are controlled by an index pointer that selects the register that is being written. The index pointer automatically increments at the end of every byte written, so that successive bytes can be written to the register array in a single transaction. This is particularly helpful when writing the address filter bitmap.

Although it is not obvious from register access transactions in FIGS. 6 and 7, when the registers of a bridge that is on a bus segment behind another bridge are accessed, the bridge transaction forwarding mechanism becomes involved. One of the artifacts of this mechanism is that the ACK bits returned to the master during the transaction actually come from different devices at different points in the transaction.

For example, when the master initiates a transaction and issues the initial bridge address of 62h, ACK bits are returned by all bridges on the same bus segment as the master. The same is true for the bridge ID byte that follows. When the command byte then is sent, all bridges except the one that is in the path to the targeted bridge abort the transaction, leaving only the master and a single bridge to continue the transaction. If the transaction were to a bridge on the same segment as the master, the transaction completes locally.

However, in the case of a multi-level bus topology where the target bridge is on a separate bus segment located behind a bridge on the master's bus segment, the transaction will be forwarded to the next bus along the path to the target bridge. The decision whether to forward the transaction is made by each bridge, by comparing the specified bridge ID to the range of bridge IDs defined by the NXT_BRID and LST_BRID registers. If the specified ID falls within this range, then the transaction will be forwarded by that bridge to its port-B bus. After the forwarding bridge has repeated the I²C address byte 62h, the bridge ID, and the command byte, it enters transparent mode of operation in which is simply passes bits back and forth between its port-A and port-B interfaces.

This forwarding action takes place at each level of bus hierarchy between the initiating master and the target bridge. When the target bridge has been reached, it will return an ACK signal in response to the command byte, which is passed back up the hierarchy to the initiating master. Thus, the ACK signal returning from the command byte is the first ACK in the transaction that has actually come from the bridge intended as the target of the transaction.

The register access read command is shown in FIG. 7 and starts with the bridge address of 62h (702), followed by the bridge ID 704. Next, a command byte 706 of 00h is transmitted to indicate a register access command, and then the register index 708 is transmitted. At this point during a read transaction, a repeated START condition 710 is transmitted to reverse the data direction. Following this repeated START 710, the master issues the bridge read address 712 of 63h. Note that no bridge ID or command byte is issued at this point in the transaction. Rather, all the bridges in the path to the target bridge retain enough internal state such that they can continue forwarding the transaction to the bridge specified in the write portion of the transaction. Thus, the repeated START 710 and the read address 712 of 63h are forwarded along the path to the target bridge followed by the read data bytes 714–716. The target bridge is fully unaware that the read transaction has come from a distant bus segment connected through possibly several layers of bridges, and simply returns the read data. The bridges in the active path through the hierarchy pass the read bits from the target bridge back to the initiating master, and also the ACK bits from the master back to the target bridge.

When the initiating master is finished reading bytes, it returns a NAK signal in response to the last byte as per standard I²C protocol and issues a STOP. The STOP is similarly forwarded down the path through the bus hierarchy to the target bridge, at which point the transaction has ended.

The 32 bytes in the address bitmap comprise 256 bits, which allows one bit for every possible read/write address in an eight-bit I²C address space. At the beginning of an I²C transaction, a bridge absorbs the entire 8-bit address (7-bit address plus the read/write bit) from its port-A interface and checks the corresponding bit in the address bitmap. If the bit is a '1', then the bridge will acquire the bus connected to its port-B interface and re-drive the transaction.

When the bridge receives an ACK or NAK bit from the port-B interface, it passes the bit back to the port-A interface and the proceeds with the rest of the transaction in a transparent manner, passing data and ACK/NAK bits back and forth between the two interfaces. When the port-A master terminates the transaction with a STOP condition, the bridge will, in turn, terminate the port-B transaction with a STOP.

Another set of bridge commands that can be issued by a master are a "tunnel" read/write commands. Transaction tunneling is a mechanism provided by the inventive bridge to complement the address filtering mechanism. As previously described, address filtering allows the 128 possible read/write addresses of the I²C bus to be distributed arbitrarily among the bus segments of an I²C bus topology. The address bitmap of each bridge allows transactions to be forwarded as required up and down through the bus hierarchy to establish a transparent communication path between a master and the addressed slave. In some cases, however, it may be necessary for some number of slave devices to be assigned the same I²C address. In this case, by placing such slave devices on separate bus segments and using the inventive bridge to connect these segments into an I²C topology, all slave devices can be uniquely addressed. The tunnel command allows a bus master to bypass the internal address bitmap in a bridge and directly specify which address will be driven by the bridge.

Figure 8:
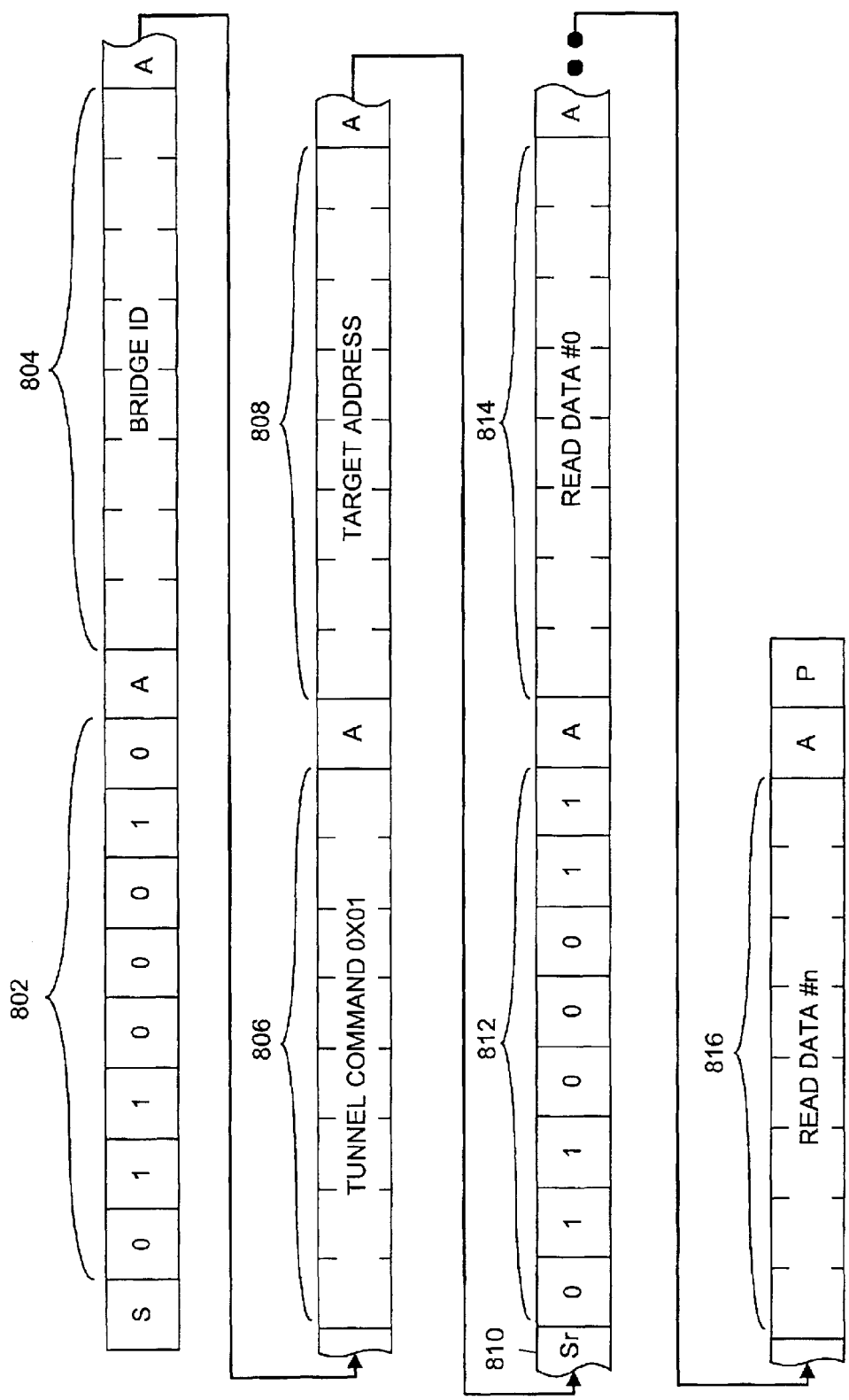
FIG. 8 is a time diagram showing the sequence of command signals generated by a bus master during a tunnel bridge command.

The syntax for a tunnel read command is shown in FIG. 8 and starts with the bridge address of 62h (802), followed by the bridge ID 804. Next, a command byte 806 of 01 h is transmitted to indicate a tunnel command, and then the target address 808 is transmitted. At this point during a read transaction, a repeated START condition 810 is transmitted to reverse the data direction. Following this repeated START 810, the master issues the bridge read address 812 of 63h. Again, no bridge ID or command byte is issued at this point in the transaction. Rather, all the bridges in the path to the target bridge retain enough internal state such that they can continue forwarding the transaction to the bridge specified in the write portion of the transaction. Thus, the repeated START 810 and the read address 812 of 63h are forwarded along the path to the target bridge along with the read data bytes 814–816.

The tunnel write command is similar, but does not include the repeated START 810. Instead, the write data bytes are driven by the master immediately following the target address byte in a manner consistent with the slave being accessed.

In a manner similar to that described above for the register access command, a tunneled transaction is forwarded by the bridges in the system until the transaction reaches the target bridge as specified in the bridge ID byte. This bridge then recognizes the tunnel command byte 806 and interprets the following target address byte 808 as the slave address to be driven on its port-B bus. Once the target bridge has driven a START and the specified slave address on its port-B bus, it begins transparently forwarding data and ACK bits between its port-A and port-B interfaces. Similarly, any other bridges in the path between the initiating master and the target slave device operate transparently at this point. As in the case of a bridge register access, all the bridges in the active path through the hierarchy maintain this transparent mode of operation even through the repeated START 810 shown in FIG. 8. All bridges forward the initiating master's STOP condition at the end of the transaction, thus returning all the active bus segments to the idle state.

A final command that can be issued by a master is the UNCONFIG command. This command is a special type of command issued by the configuration host to return all bridges to their default unconfigured state, i.e. with their bridge IDs set to 00h, and with address filtering and deterministic arbitration support disabled. The UNCONFIG command could be used, for example, after a new hot-plug device has been added into the system. If the new device includes any bridge chips, then all the bridges in the system will possibly need to be renumbered in order to preserve the correctness of the bridge command forwarding mechanism. The addition of new I²C slave addresses to the I²C hierarchy can generally be accommodated without the need to unconfigure/reconfigure the bridges; a simple modification to the address filter bitmaps of the bridges in the hierarchy is generally sufficient.

The inventive bridge supports multimaster I²C operation on both its port-A and port-B interfaces. Since the bridge acts only as a slave on its port-A interface, there is nothing specific that it needs to do in order to support multimaster traffic on this interface. However, the port-B interface, acts as the master interface. Because of this, the bridge must handle all of the normal issues associated with multimaster I²C bus activity.

Perhaps the most basic requirement for a multimaster capable I²C master is the ability to perform bus arbitration. According to the aforementioned I²C Specification from Philips Semiconductor, bus arbitration is based on collisions between competing master or slave devices. Any device driving the bus with a pattern of address, data, or ACK/NAK bits watches the bus while it transmits, checking that the data appearing on the bus is what the device intended to drive. Because of the open-collector nature of the I²C bus, a device driving a "0" will always win out over a device driving a "1". When a device detects a "0" on the bus when it intended to drive a "1", it immediately aborts its involvement in the current transfer and releases the SCL and SDA lines.

A master device that "loses arbitration" in this manner may retry its transaction when the current transaction is terminated via a STOP condition. However, one problem with the I²C arbitration mechanism as designed by Philips Semiconductor is that, if multiple masters collide while driving the same address, such as if two masters attempt to write to the same device at the same time, then no collision will be detected, and both masters will proceed together on the bus, unaware of each other's presence. It is likely in this scenario that the masters will drive different data later in the write transaction, resulting in a loss of arbitration very late in a transaction. Handling this type of late loss of arbitration may be complex depending on the application, since some number of data bytes may have already been committed to the device before the error was detected.

Another problem that may arise when two masters are unknowingly on the bus at the same time is that the I²C arbitration mechanism does not work during START or STOP conditions. Thus, if one of the colliding masters issues a STOP or repeated START, the other master will need to handle this asynchronous error event in the midst of its write transaction.

In order to prevent these types of complex error scenarios, an extension to the I²C Specification was developed by Sun Microsystems called the "Deterministic Arbitration Protocol", more commonly referred to as the DA protocol and described in the aforementioned U.S. Pat. No. 6,175,887. The concept of the DA protocol is straightforward. Following a bus-idle condition, I²C masters implementing the DA protocol always drive as their first address a master-specific bit pattern called an "arbitration ID." By virtue of the fact that every master has a unique arbitration ID, this ensures that any masters colliding on the bus will detect the collision during this initial address phase. Following the transmission of the arbitration ID, the winning master proceeds with its intended I²C transaction via a repeated START. Thus, all the complexities associated with late collisions and asynchronous START or STOP conditions due to collisions are avoided.

In accordance with the principles of the invention, the bridge provides some special facilities for handling the DA protocol. For example, consider a configuration including an I²C bus with a master, a few slave devices, and an inventive bridge behind which are more slave devices.

Because the arbitration ID used by the master is used on every transaction, this initial address phase does not provide an indication of whether the intended transaction needs to be forwarded by the bridge. In fact, the bridge must be configured such that the bit-pattern used as the arbitration ID corresponds to an address that is not forwarded by the bridge. Otherwise, the bridge would claim and forward every transaction from the master, preventing the master from reliably communicating with the slave devices on the same bus segment with the master.

Rather, by programming the bridge's bitmap with a '0' in the bit position corresponding to the arbitration ID used by the master, the bridge will ignore the address issued as the DA protocol portion of the transaction. Following the transmission of the DA arbitration ID, the master will issue a repeated START and then the slave address of the intended target of the transaction.

The bridge will again look up this new address in its internal bitmap, and, if the corresponding bit is a '1', the remainder of the transaction will be forwarded to the port-B bus. Since by necessity the bridge ignored the DA portion of the transaction, the port-A master's DA arbitration ID does not pass to the port-B bus. Therefore, a mechanism has been provided in the bridge to cause it to use the DA protocol with a programmable DA arbitration ID when it forwards transactions to the port-B I²C bus.

This is accomplished through two registers, called DA_EN and DA_ID. These registers are discussed above in connection with FIGS. 3E and 3F but basically the DA_ID register, shown in FIG. 3F, contains the arbitration ID to be driven by the bridge on the port-B bus when forwarding transactions, and the DA_EN register, shown in FIG. 3E, is used to enable or disable the DA protocol. The default state following a reset is for bridges to not use the DA protocol.

In the process of forwarding transactions from the port-A interface to the port-B interface, collisions may occur if other masters exist on the port-B bus. If a bridge is configured to use the aforementioned DA protocol on the port-B bus, then these collisions should happen only in the first address phase of a new transaction, but nonetheless it is possible that a bridge will lose the arbitration process and be forced to relinquish the port-B bus. In the case where the arbitration loss occurs during the initial address, a bridge will automatically attempt retransmission of the forwarded transaction, up to a limit of ten (10) attempts per transaction. This automatic retry mechanism works only if the loss of arbitration occurs during the initial address phase. If the bridge loses arbitration ten times in a row while attempting to transmit the initial address phase on a given transaction, it will finally give up and return a NAK condition to the port-A master device.

Because the port-B master port on an inventive bridge can be connected to a multimaster bus, there are a number of error scenarios that may present themselves on the port-B interface. These are briefly:

1.) Transaction retry limit of ten retries exhausted.
2.) Late loss of arbitration.
3.) Asynchronous START or STOP detected.
4.) Failure to acquire port-B bus within 200 milliseconds.
5.) Slave on Port-B bus stalls a transaction with SCL low for more than 200 milliseconds.
6.) Protocol hang on port-B bus (Bus remains "busy" but with no activity.)
7.) Port-B slave device holding SDA low due to loss of bit synchronization.

Because the I²C bus does not provide any error reporting mechanisms aside from the NAK response, most of the errors listed above are signaled to the master connected to the port-A interface via NAK responses. The exceptions are items (6) and (7). The error scenarios described in items (6) and (7) above are recoverable situations in most cases. These recoverable port-B errors can be caused by a malfunctioning master or slave device on port-B, or if a master device, such as an inventive bridge, driving a transaction on the bus, is reset by the system in the middle of its transaction. When one of the following situations occurs, the bus can get into a state where master and slave devices are out of synchronization with regard to whether the bus is idle or busy, and also with regard to bit and byte synchronization.

In a first situation, a bridge believes that the bus is currently busy, but there is actually no master on the bus currently driving a transaction. This can happen if a master (other than an inventive bridge) issues a START condition, but then aborts its transaction without issuing a STOP condition. In this case, all I²C devices will consider the bus busy, and since the I²C protocol has no timeouts defined with regard to this type of hang, it can persist indefinitely.

In another situation, a master device aborts a transaction suddenly in the middle of reading a data byte from a slave, and if the slave happens to be driving a "0" on the bus, then the slave will continue to drive a "0" on the SDA line, waiting for the master to finish the transaction. Since the master has aborted the transaction, the bus is hung both from a protocol perspective as mentioned in the previous situation, but also because the slave is holding the SDA line LOW, which prevents masters from issuing new START or STOP conditions.

In order to recover from these two situations, when an inventive bridge is attempting to acquire the port-B bus, if the bus remains busy for 200 milliseconds, it will assume that the bus has become hung, i.e. that a master aborted a transaction, leaving the bus in the "busy" state. The bridges will then look at the SDA line to see whether any slave device appears to be holding the SDA line LOW. If so, it will toggle the clock line up and down in an attempt to cause the slave to shift out bits on the assumption that when the slave reaches what it believes to be the ACK bit, it will release SDA. When the bridge senses the SDA line become HIGH, it will then issue a START/STOP on the SDA/SCL lines to bring all I²C devices back into byte synchronization and protocol synchronization.

Note that, in the I²C bus definition, there is no recovery from the situation when a device hangs holding the SCL line LOW. If this happens to the port-B bus because of an errant device on that bus, then all transactions from a port-A master targeted to slave devices on the port-B bus will receive a NAK response from the bridge after a 200 millisecond timeout.

In addition to the error handling capabilities on the port-B interface, the port-A interface also implements a watchdog timer. This timer watches activity on the port-A interface and will cause the bridge to reset itself in the event that the transaction on the port-A interface stalls and fails to make forward progress for more than one second. In this way, if there is some type of electrical problem on the port-A interface that looks like a START condition, such as could occur when installing a hot-pluggable device, the bridge will reset itself after one second and will subsequently be ready for new activity. It should be noted that any master on a bus segment that also connects to the port-A interface of an inventive bridge must not stall its own transactions for more than one second, as this will cause the bridge to reset. In general, problems will begin to occur if master or slave devices stall transactions for more than 200 ms, since this will affect any bridges with port-B interfaces connected to that bus. The watchdog reset does not alter any software-visible state within a bridge.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementation a different microcontroller may be used. Other aspects, such as the specific state flows, as well as other modifications to the inventive concept are intended to be covered by the appended claims

What is claimed is:

1. A bridge apparatus for connecting a first multimaster bus I²C environment to a second multimaster bus I²C environment, comprising:
   an address bitmap having a value associated with each possible I²C address;
   a port-A interface that is connected to, and receives address signals and data signals from, the first multimaster bus, buffers the received address signals and data signals and generates new data signals on the first multimaster bus;
   a port-B interface independent from the port-A interface that is connected to, and generates new address signals and data signals on, the second multimaster bus and receives data signals from the second mulimaster bus; and
   a controller that is connected to the port-A interface and to the port-B interface and responds to buffered address and data received in the port-A interface from the first multimaster bus by controlling the port-B interface to selectively generate on the second multimaster bus new address and data signals corresponding to the received address and data depending on the address bitmap value associated with the received address.

2. The bridge apparatus of claim 1 wherein the controller comprises a command interpreter that receives commands at the port-A interface from the first multimaster bus and controls the operation of the bridge apparatus in response to received commands.

3. The bridge apparatus of claim 2 wherein a tunnel command received by the bridge apparatus includes a tunnel address and the controller responds to the tunnel address by controlling the port-B interface to generate the tunnel address on the second multimaster bus.

4. The bridge apparatus of claim 2 further comprising a plurality of registers, each holding a value that control the operation of the bridge apparatus and wherein the command interpreter receives commands at the port-A interface from the first multimaster bus and places a value in at least one of the registers in response thereto.

5. The bridge apparatus of claim 4 wherein a first register holds a bridge ID value and each command contains a bridge ID value and wherein the command interpreter comprises a mechanism which responds to a command when the bridge ID value therein equals the bridge ID in the first register.

6. The bridge apparatus of claim 5 wherein a second register defines a range of bridge IDs and wherein the command interpreter comprises another mechanism that transmits a command received from the first multimaster bus on the second multimaster bus when the bridge ID in the received command is in the range of bridge IDs.

7. The bridge apparatus of claim 1 wherein the controller is a programmed microcontroller.

8. The bridge apparatus of claim 7 wherein the microcontroller comprises a RAM memory wherein the address bitmap is located.

9. The bridge apparatus of claim 7 wherein the microcontroller is connected to the port-A interface by a clock and data line and the microcontroller detects a START signal by generating an interrupt based on a signal on the data line.

10. A bi-directional bridge apparatus for connecting a first multimaster bus I²C environment and a second multimaster bus I²C environment, comprising:
a first unidirectional bridge device having, a first address bitmap with a value associated with each possible I²C address, a first port-A interface that is connected to, and receives and buffers address and data signals from, the first multimaster bus, a first port-B interface independent from the first port-A interface that is connected to, and generates new address and data signals on the second multimaster bus; and a first controller that is connected to the first port-A interface and to the first port-B interface and is responsive to buffered address and data received on the first port-A interface from the first multimaster bus for controlling the first port-B interface to generate on the second multimaster bus new address and data corresponding to address and data received on the first multimaster bus depending on a first address bitmap value associated with the address received on the first port-A interface and
a second unidirectional bridge device having, a second address bitmap with a value associated with each possible I²C address, a second port-A interface that is connected to, and receives and buffers address and data signals from the second multimaster bus, a second port-B interface independent from the second port-A interface that is connected to, and generates new address and data signals on the first multimaster bus, and a second controller that is connected to the second port-A interface and the second port-B interface and is responsive to buffered address and data received on the second port-A interface from the second multimaster bus for controlling the second port-B interface to generate on the first multimaster bus new address and data corresponding to the address and data received on the second multimaster bus depending on a second address bitmap value associated with the address received on the second port-A interface.

11. The bi-directional bridge apparatus of claim 10 wherein each of the first and second unidirectional bridge devices comprises a mechanism for designating whether that unidirectional bridge device will have priority when both the first and second unidirectional bridge devices simultaneously begin a transaction.

12. The bi-directional bridge apparatus of claim 11 wherein each of the first and second unidirectional bridge devices further comprises a deadlock mechanism that cooperates with the designating mechanism and the deadlock mechanism of the other unidirectional bridge device for enabling one of the first and second unidirectional bridge devices and disabling the other unidirectional bridge device when both unidirectional bridge devices simultaneously begin a transaction.

13. The bi-directional bridge apparatus of claim 10 wherein the first unidirectional bridge device further comprises a plurality of registers, each holding a value that controls the operation of the first unidirectional bridge device and wherein the first controller comprises a first command interpreter that receives commands at the first port-A interface from the first multimaster bus and places a value in at least one of the registers in response thereto.

14. The bi-directional bridge apparatus of claim 13 wherein each of the commands contains a bridge ID and at least one of the registers defines a range of bridge IDs and wherein the first command interpreter comprises a mechanism that transmits a command received from the first multimaster bus on the second multimaster bus when the bridge ID in the received command is in the range of bridge IDs.

15. The bi-directional bridge apparatus of claim 10 wherein the second unidirectional bridge device further comprises a plurality of registers, each holding a value that controls the operation of the second unidirectional bridge device and wherein the second controller comprises a second command interpreter that receives commands at the second port-A interface from the second multimaster bus and places a value in at least one of the registers in response thereto.

16. The bi-directional bridge apparatus of claim 15 wherein each of the commands contains a bridge ID and at least one of the registers defines a range of bridge IDs and wherein the second command interpreter comprises a mechanism that transmits a command received from the second multimaster bus on the first multimaster bus when the bridge ID in the received command is outside the range of bridge IDs.

17. The bi-directional bridge apparatus of claim 15 wherein a first register in the first unidirectional bridge device holds a first bridge ID value and a second register in the second unidirectional bridge device holds a second bridge ID value different from the first bridge ID value.

18. The bi-directional bridge apparatus of claim 13 wherein a register in the first unidirectional bridge device holds a first bridge ID value and a register in the second unidirectional bridge device holds a second bridge ID value different from the first bridge ID value.

19. The bi-directional bridge apparatus of claim 18 wherein each command contains a bridge ID value and wherein the first command interpreter comprises a mechanism which responds to a command when the bridge ID value therein equals the first bridge ID.

20. The bi-directional bridge apparatus of claim 17 wherein each command contains a bridge ID value and wherein the second command interpreter comprises a mechanism which responds to a command when the bridge ID value therein equals the second bridge ID.

21. A method for connecting a first multimaster bus I²C environment to a second multimaster bus I²C environment, comprising
(a) connecting the first multimaster bus to the second multimaster bus with a bridge having an address bitmap with a value associated with each possible I²C address, a port-A interface that is connected to, and receives address signals and data signals from the first multimaster bus, buffers the received address signals and data signals and generates new data signals on the first multimaster bus and a port-B interface independent from the port-A interface that is connected to, and generates new address signals and data signals on the second multimaster bus and receives data signals from the second multimaster bus; and
(b) in response to buffered address and data received in the port-A interface from the first multimaster bus controlling the port-B interface to selectively generate new address and data on the second multimaster bus corresponding to the received address and data depending on the address bitmap value associated with the received address.

22. The method of claim 21 wherein step (b) comprises receiving commands at the port-A interface from the first multimaster bus and controlling the operation of the bridge apparatus in response to received commands.

23. The method of claim 22 wherein a tunnel command received by the bridge apparatus includes a tunnel address and wherein step (b) further comprises passing the tunnel address to the port-B interface for transmission on the second multimaster bus.

24. The method of claim 22 wherein the bridge further comprises a plurality of registers, each holding a value that control the operation of the bridge apparatus and wherein step (b) comprises receiving commands at the port-A interface from the first multimaster bus and places a value in at least one of the registers in response thereto.

25. The method of claim 24 wherein a first register holds a bridge ID value and each command contains a bridge ID value and wherein step (b) comprises responding to a command when the bridge ID value therein equals the bridge ID in the first register.

26. The method of claim 25 wherein a second register defines a range of bridge IDs and step (b) comprises transmitting a command received from the first multimaster bus on the second multimaster bus when the bridge ID in the received command is in the range of bridge IDs.

27. The method of claim 21 wherein the bridge comprises a programmed microcontroller that performs step (b).

28. The method of claim 27 wherein the microcontroller comprises a RAM memory wherein the address bitmap is located.

29. The method of claim 27 wherein the microcontroller is connected to the port-A interface by a clock and data line and the microcontroller detects a START signal by generating an interrupt based on a signal on the data line.

30. A method for connecting a first multimaster bus $I^2C$ environment and a second multimaster bus $I^2C$ environment, comprising
   (a) connecting the first multimaster bus to the second multimaster bus with a first unidirectional bridge device having, a first address bitmap having a value associated with each possible $I^2C$ address, a first port-A interface that is connected to, and receives address and data signals from the first multimaster bus, a first port-B interface independent from the first port-A interface that is connected to, and generates new address and data signals on the second multimaster bus;
   (b) in response to an address and data received on the port-A interface from the first multimaster bus to selectively controlling the first port-B interface to generate on the second multimaster bus new address and data corresponding to the address and data received from the first multimaster bus depending on the first address bitmap value associated with the address;
   (c) connecting the second multimaster bus to the first multimaster bus with a second unidirectional bridge device having, a second address bitmap having a value associated with each possible $I^2C$ address, a second port-A interface that is connected to, and receives address and data signals from the second multimaster bus, a second port-B interface independent from the second port-A interface that is connected to, and generates new address and data signals to on the first multimaster bus; and
   (d) in response to an address and data received on the port-A interface from the second multimaster bus selectively controlling the second port-B interface to generate on the first multimaster bus new address and data corresponding to the address and data received from the second multimaster bus depending on the second address bitmap value associated with the address.

31. The method of claim 30 wherein both the first and second unidirectional bridge devices have a mechanism for designating whether a unidirectional bridge device is one of an upstream bridge and a downstream bridge.

32. The method of claim 30 further comprising a deadlock mechanism for choosing one of the unidirectional bridge devices when both unidirectional bridge devices simultaneously begin a transaction.

33. The method of claim 30 wherein the first unidirectional bridge device further comprises a plurality of registers, each holding a value that control the operation of the first unidirectional bridge device and wherein step (b) comprises receiving commands at the port-A interface from the first multimaster bus and placing a value in at least one of the registers in response thereto.

34. The method of claim 33 wherein each of the commands contains a bridge ID and at least one of the registers defines a range of bridge IDs and wherein step (b) comprises transmitting a received command on the second multimaster bus when the bridge ID in the received command is in the range of bridge IDs.

35. The method of claim 30 wherein the second unidirectional bridge device further comprises a plurality of registers, each holding a value that control the operation of the second unidirectional bridge device and wherein step (d) comprises receiving commands at the port-A interface from the second multimaster bus and placing a value in at least one of the registers in response thereto.

36. The method of claim 35 wherein each of the commands contains a bridge ID and at least one of the registers defines a range of bridge IDs and wherein step (d) comprises transmitting a received command on the first multimaster bus when the bridge ID in the received command is outside the range of bridge IDs.

37. The method of claim 35 wherein a register in the first unidirectional bridge device holds a first bridge ID value and a register in the second unidirectional bridge device holds a second bridge value different from the first bridge ID value.

38. The method of claim 37 wherein each command contains a bridge ID value and wherein step (b) comprises responding to a command when the bridge ID value therein equals the bridge ID in the first register.

39. The method of claim 38 wherein each command contains a bridge ID value and wherein step (d) comprises responding to a command when the bridge ID value therein equals the bridge ID in the first register.

* * * * *